United States Patent
Nakazawa et al.

(10) Patent No.: US 11,299,575 B2
(45) Date of Patent: Apr. 12, 2022

(54) WATER-BASED RESIN COMPOSITION, WATER-BASED PAINT, AND ARTICLE

(71) Applicant: DIC Corporation, Tokyo (JP)

(72) Inventors: Daisuke Nakazawa, Osaka (JP); Norio Kosaka, Osaka (JP); Hideaki Kawahara, Osaka (JP)

(73) Assignee: DIC CORPORATION, Tokyo (JP)

( * ) Notice: Subject to any disclaimer, the term of this patent is extended or adjusted under 35 U.S.C. 154(b) by 203 days.

(21) Appl. No.: 16/616,704

(22) PCT Filed: May 15, 2018

(86) PCT No.: PCT/JP2018/018687
§ 371 (c)(1),
(2) Date: Nov. 25, 2019

(87) PCT Pub. No.: WO2018/221199
PCT Pub. Date: Dec. 6, 2018

(65) Prior Publication Data
US 2021/0163651 A1    Jun. 3, 2021

(30) Foreign Application Priority Data
May 30, 2017 (JP) .............................. JP2017-106548

(51) Int. Cl.
C08F 279/02 (2006.01)
C08F 220/18 (2006.01)
C08F 8/04 (2006.01)
C08F 136/06 (2006.01)
C08F 220/06 (2006.01)
C08F 220/14 (2006.01)
C08F 220/20 (2006.01)
C08K 5/17 (2006.01)
C09D 151/04 (2006.01)

(52) U.S. Cl.
CPC .............. *C08F 279/02* (2013.01); *C08F 8/04* (2013.01); *C08F 136/06* (2013.01); *C08F 220/06* (2013.01); *C08F 220/14* (2013.01); *C08F 220/1802* (2020.02); *C08F 220/1804* (2020.02); *C08F 220/1806* (2020.02); *C08F 220/1808* (2020.02); *C08F 220/1811* (2020.02); *C08F 220/1812* (2020.02); *C08F 220/20* (2013.01); *C08K 5/17* (2013.01); *C09D 151/04* (2013.01); *C08F 2810/20* (2013.01)

(58) Field of Classification Search
None
See application file for complete search history.

(56) References Cited

U.S. PATENT DOCUMENTS

| | | | |
|---|---|---|---|
| 2003/0158331 A1* | 8/2003 | Shoaf | C08L 51/04 524/821 |
| 2015/0037591 A1* | 2/2015 | Ishikura | B05D 3/0254 428/423.1 |
| 2019/0270919 A1* | 9/2019 | Yoshiwara | C08J 3/24 |

FOREIGN PATENT DOCUMENTS

| | | | |
|---|---|---|---|
| JP | H06108003 A | | 4/1994 |
| JP | H0892427 A | | 4/1996 |
| JP | 09208882 A | * | 8/1997 |
| JP | H09208882 A | | 8/1997 |
| JP | 2004352836 A | | 12/2004 |
| JP | 2008144146 A | | 6/2008 |
| JP | 2009270031 A | | 11/2009 |
| JP | 6323973 B2 | | 5/2018 |
| WO | 2016072145 A1 | | 5/2016 |
| WO | WO-2016072145 A1 | * | 5/2016 ............. C08G 18/62 |

OTHER PUBLICATIONS

JP-09208882-A, machine translation and partial human translation (Year: 1997).*
WO-2016072145-A1, machine translation (Year: 2016).*
International Search Report and Written Opinion issued in corresponding International Application No. PCT/JP2018/018687, dated Jul. 24, 2018, with English translation of the International Search Report.

* cited by examiner

*Primary Examiner* — Satya B Sastri
(74) *Attorney, Agent, or Firm* — McDermott Will & Emery LLP

(57) ABSTRACT

There is provided a water-based resin composition that contains a polymer (A) containing, as essential raw materials, a hydrogenated polybutadiene (a1) with an iodine value in the range of 5 to 25, a monomer (a2) with an acid group, and a monomer (a3) with a hydroxy group, a basic compound (B), and an aqueous medium (C), wherein the hydrogenated polybutadiene (a1) constitutes 4% to 38% by mass of the raw materials of the polymer (A), and the polymer (A) has an acid value in the range of 10 to 65 mgKOH/g. A water-based resin composition of the present invention has high storage stability and forms a coating film with good physical properties, such as high adhesiveness to various substrates and high blocking resistance, and is therefore suitably used in a water-based paint.

5 Claims, No Drawings

WATER-BASED RESIN COMPOSITION, WATER-BASED PAINT, AND ARTICLE

CROSS REFERENCE

This patent application is the U.S. National Phase under 35 U.S.C. § 371 of International Application No. PCT/JP2018/018687, filed on May 15, 2018, which claims the benefit of Japanese Patent Application No. 2017-106548, filed on May 30, 2017, the entire contents of each are hereby incorporated by reference.

TECHNICAL FIELD

The present invention relates to a water-based resin composition useful for a water-based paint.

BACKGROUND ART

Due to their high weatherability, flexibility, strength, and adhesiveness, acrylic resins have been widely used in paints, inks, adhesives, and synthetic leathers. In particular, in paint applications, acrylic resins have been developed that satisfy performance requirements as base resins of paints for coating various substrates (for example, metals, woods, paper, and plastics) in the fields of automobiles, household electrical appliances, and construction materials.

Plastic formed products formed of resin materials, for example, acrylonitrile-butadiene-styrene copolymers, polycarbonate, and polystyrene have been widely used due to their low costs and high formability. The thicknesses of plastic formed products are being decreased to achieve weight reduction required for the plastic formed products.

A decrease in thickness, however, results in a decrease in mechanical strength. Thus, there have been many glass-fiber-reinforced plastic formed products formed of materials with higher mechanical strength, such as glass-fiber-reinforced polyamide or glass-fiber-reinforced polycarbonate. Glass-fiber-reinforced plastics, however, are significantly different in polarity from known general-purpose plastics, and even acrylic resins that can form coating films with high adhesiveness to other resins cannot exhibit sufficient adhesion to glass-fiber-reinforced plastics.

In recent years, substrates of difference types, such as metals and plastics, have increasingly been used in combination in the fields of automobiles, household electrical appliances, and construction materials. Thus, base resins of paints for coating these substrates are required to have high adhesiveness to every substrate.

Furthermore, with stricter environmental regulations in recent years, a reduction of volatile organic compounds "VOCs" emitted in the coating process has been strongly required. Consequently, known solvent-based paints containing organic solvents are becoming difficult to use, and water-based paints with less VOCs are increasingly used all over the world.

To improve adhesion to the glass-fiber-reinforced plastics, one proposed resin composition is produced by polymerizing a vinyl monomer containing a phosphorus atom in the presence of a polyol (see PTL 1, for example). Although a coating film of a paint containing this resin composition has improved adhesiveness to a substrate, the paint must be used in a two-component system including a curing agent to provide good adhesion. Unfortunately, the two-component system has poor workability due to its short pot life. Furthermore, the resin composition has very low solubility in polar solvents for use in water-based resins, such as water, glycol, and alcohols, and it is therefore difficult to use the resin composition as a resin for water-based paints.

Thus, there is a demand for a material that has high adhesiveness to a wide variety of substrates, such as plastics, metals, and glass, and that is compatible with water-based paints.

CITATION LIST

Patent Literature

PTL 1: Japanese Unexamined Patent Application Publication No. 2009-270031

SUMMARY OF INVENTION

Technical Problem

It is an object of the present invention to provide a water-based resin composition that has high storage stability and forms a coating film with good physical properties, such as high adhesiveness to various substrates and high blocking resistance.

Solution to Problem

The present inventors have studied to achieve the object and found that a water-based resin composition containing a polymer (A) with a particular composition, a basic compound (B), and an aqueous medium (C) can achieve the object.

Accordingly, the present invention relates to a water-based resin composition that contains a polymer (A) containing, as essential raw materials, a hydrogenated polybutadiene (a1) with an iodine value in the range of 5 to 25, a monomer (a2) with an acid group, and a monomer (a3) with a hydroxy group, a basic compound (B), and an aqueous medium (C), wherein the hydrogenated polybutadiene (a1) constitutes 4% to 38% by mass of the raw materials of the polymer (A), and the polymer (A) has an acid value in the range of 10 to 65 mgKOH/g.

Advantageous Effects of Invention

A water-based resin composition of the present invention has high storage stability and forms a coating film with high adhesiveness to various substrates and high blocking resistance, and can therefore be used in a water-based paint.

DESCRIPTION OF EMBODIMENTS

A water-based resin composition of the present invention contains a polymer (A) containing, as essential raw materials, a hydrogenated polybutadiene (a1) with an iodine value in the range of 5 to 25, a monomer (a2) with an acid group, and a monomer (a3) with a hydroxy group, a basic compound (B), and an aqueous medium (C), wherein the hydrogenated polybutadiene (a1) constitutes 4% to 38% by mass of the raw materials of the polymer (A), and the polymer (A) has an acid value in the range of 10 to 65 mgKOH/g.

First, the polymer (A) is described below. The polymer (A) contains a hydrogenated polybutadiene (a1) with an iodine value in the range of 5 to 25, a monomer (a2) with an acid group, and a monomer (a3) with a hydroxy group as essential raw materials.

The hydrogenated polybutadiene (a1) with an iodine value of less than 5 undergoes insufficient radical polymerization with monomers (a2) to (a4), thus resulting in a polymer with low temporal stability or a coating film with a low degree of uniformity. On the other hand, the hydrogenated polybutadiene (a1) with an iodine value of more than 25 has an excessively large number of C=C bonds per chain of the hydrogenated polybutadiene (a1), and, like a polyfunctional (meth)acrylate, acts as a cross-linking site in the radical polymerization process and promotes gelation.

The hydrogenated polybutadiene (a1) preferably has a number-average molecular weight in the range of 1,000 to 5,000, more preferably 1,500 to 3,500, to further improve storage stability and the balance between adhesiveness and blocking resistance of the coating film. A molecular weight of less than 1,000 results in a coating film with poor adhesiveness, and a molecular weight of more than 5,000 results in a coating film with low blocking resistance.

The hydrogenated polybutadiene (a1) may have a terminal hydroxy group.

The hydrogenated polybutadiene (a1) may be used alone, or two or more of the hydrogenated polybutadienes (a1) may be used in combination.

The hydrogenated polybutadiene (a1) can be produced by a known method. The production method is not limited to a particular method. For example, butadiene is polymerized in a solution using sodium as a catalyst to synthesize polybutadiene, and double bonds of the polybutadiene are reduced with hydrogen to produce hydrogenated polybutadiene. Addition of an epoxy compound, for example, ethylene oxide or propylene oxide to polybutadiene produced by the method produces polybutadiene with a hydroxy group. Furthermore, double bonds of the polybutadiene with a hydroxy group can be reduced with hydrogen to produce hydrogenated polybutadiene with a hydroxy group. In each case, the degree of hydrogen reduction can be changed to adjust the iodine value.

Examples of the monomer (a2) with an acid group include monomers with a carboxy group, such as (meth)acrylic acid, crotonic acid, fumaric acid, (anhydrous) maleic acid, (anhydrous) citraconic acid, and (anhydrous) itaconic acid; monomers with a phosphate group, such as 2-(meth)acryloyloxyethyl acid phosphate, 3-(meth)acryloyloxypropyl acid phosphate, (meth)acryloyloxy polyoxyethylene glycol acid phosphate, and (meth)acryloyloxy polyoxypropylene glycol acid phosphate; and monomers with a sulfonate group, such as vinyl sulfonic acid. These monomers (a2) may be used alone or in combination.

The term "(meth)acrylic acid", as used herein, refers to one or both of "acrylic acid" and "methacrylic acid". The term "(anhydrous) maleic acid", as used herein, refers to one or both of "maleic acid" and "maleic anhydride". The same applies to other acid anhydrides. The term "(meth)acryloyl", as used herein, refers to one or both of "acryloyl" and "methacryloyl". The term "(meth)acrylate", as used herein, refers to one or both of "acrylate" and "methacrylate".

Examples of the monomer (a3) with a hydroxy group include 2-hydroxyethyl (meth)acrylate, 2-hydroxypropyl (meth)acrylate, 3-hydroxypropyl (meth)acrylate, 4-hydroxybutyl (meth)acrylate, 2-hydroxybutyl (meth)acrylate, 3-hydroxybutyl (meth)acrylate, 1,4-cyclohexanedimethanol mono(meth)acrylate, glycerin mono(meth)acrylate, poly(ethylene glycol) mono(meth)acrylate, poly(propylene glycol) mono(meth)acrylate, 2-hydroxy-3-phenoxypropyl (meth)acrylate, 2-(meth)acryloyloxyethyl-2-hydroxyethyl phthalate, and lactone-modified (meth)acrylate with a terminal hydroxy group. Among these, to further improve the adhesiveness and blocking resistance of a resulting coating film, a hydroxyalkyl (meth)acrylate having 1 to 4 alkyl carbon atoms is preferred, and 2-hydroxyethyl (meth)acrylate and 2-hydroxypropyl (meth)acrylate are more preferred. These monomers (a3) may be used alone or in combination.

The raw materials of the acrylic resin (A) may include another optional monomer (a4) in addition to the hydrogenated polybutadiene (a1), the monomer (a2) with an acid group, and the monomer (a3) with a hydroxy group.

Examples of the other monomer (a4) include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, 2-ethylhexyl (meth)acrylate, nonyl (meth)acrylate, decyl (meth)acrylate, dodecyl (meth)acrylate, tridecyl (meth)acrylate, cetyl (meth)acrylate, stearyl (meth)acrylate, behenyl (meth)acrylate, cyclohexyl (meth) acrylate, 4-tert-butylcyclohexyl (meth)acrylate, isobornyl (meth) acrylate, dicyclopentanyl (meth) acrylate, benzyl (meth) acrylate, (meth) acrylamide, N,N-dimethyl (meth) acrylamide, (meth) acrylonitrile, 3-(meth)acryloylpropyltrimethoxysilane, N,N-dimethylaminoethyl (meth)acrylate, glycidyl (meth)acrylate, styrene, α-methylstyrene, p-methylstyrene, and p-methoxystyrene. These other monomers (a4) may be used alone or in combination.

Importantly, the amount of the hydrogenated polybutadiene (a1) to be used ranges from 4% to 38% by mass of the raw materials of the polymer (A) from the perspective of storage stability and the balance between adhesiveness and blocking resistance of a resulting coating film. Less than 4% by mass results in low adhesiveness of the coating film, and more than 38% by mass results in low blocking resistance and storage stability.

Importantly, the polymer (A) has an acid value in the range of 10 to 65 mgKOH/g. Preferably, the polymer (A) has an acid value in the range of 15 to 40 mg/KOH to further improve storage stability and the adhesiveness and blocking resistance of a resulting coating film. In the present invention, the acid value is calculated from the monomer composition of the raw materials.

The polymer (A) preferably has a hydroxyl value in the range of 5 to 50 mgKOH/g to further improve storage stability and the adhesiveness and blocking resistance of a resulting coating film. In the present invention, the hydroxyl value is calculated from the monomer composition of the raw materials.

The polymer (A) preferably has a weight-average molecular weight in the range of 10,000 to 100,000 to further improve storage stability and the adhesiveness and blocking resistance of a resulting coating film. The weight-average molecular weight is a polystyrene equivalent molecular weight measured by gel permeation chromatography (hereinafter abbreviated to "GPC"). Less than 10,000 results in low storage stability, and more than 100,000 results in low blocking resistance.

For example, the polymer (A) can be produced by radical polymerization of the hydrogenated polybutadiene (a1), the monomer (a2) with an acid group, the monomer (a3) with a hydroxy group, and another monomer (a4) in an organic solvent in the presence of a polymerization initiator at a temperature in the range of 60° C. to 140° C. The organic solvent may be removed by a solvent removal process after the radical polymerization.

Examples of the organic solvent include alcohol solvents, such as methanol, ethanol, propanol, n-butanol, iso-butanol, tert-butanol, and 3-methoxybutanol; ether solvents, such as diisopropyl ether; glycol solvents, such as ethylene glycol and propylene glycol; glycol ether solvents, such as ethylene glycol monomethyl ether, ethylene glycol monoethyl ether, ethylene glycol monobutyl ether, ethylene glycol dimethyl ether, diethylene glycol dimethyl ether, diethylene glycol diethyl ether, diethylene glycol dibutyl ether, propylene glycol monomethyl ether, propylene glycol propyl ether, propylene glycol butyl ether, propylene glycol dimethyl ether, dipropylene glycol monomethyl ether, and dipropylene glycol dimethyl ether; glycol ester solvents, such as ethylene glycol monoethyl ether acetate, propylene glycol monomethyl ether acetate, diethylene glycol monoethyl ether acetate, and diethylene glycol monobutyl ether acetate; ketone solvents, such as acetone, methyl ethyl ketone, methyl isobutyl ketone, and cyclohexanone; ester solvents, such as ethyl acetate and butyl acetate; dimethylformamide, dimethylacetamide, N-methylpyrrolidone, dimethyl sulfoxide, tetrahydrofuran, dioxane, toluene, and xylene. Among these, glycol ether solvents are preferred to further improve the storage stability of the water-based resin composition when used as aqueous media (C) described later. These organic solvents may be used alone or in combination.

Examples of the polymerization initiator include azo compounds, such as 2,2'-azobis(isobutyronitrile), 2,2'-azobis(2-methylbutyronitrile), and azobiscyanovaleric acid; organic peroxides, such as tert-butyl peroxypivalate, tert-butyl peroxybenzoate, tert-butyl peroxy-2-ethylhexanoate, tert-butyl peroxy-2-ethylhexylmonocarbonate, n-butyl 4,4-di(tert-butylperoxy)valerate, di-tert-butyl peroxide, di-tert-butyl hydroperoxide, cumene hydroperoxide, benzoyl peroxide, and tert-butyl hydroperoxide; and inorganic peroxides, such as hydrogen peroxide, ammonium persulfate, potassium persulfate, and sodium persulfate. These polymer initiators may be used alone or in combination. The amount of the polymerization initiator preferably ranges from 0.1% to 10% by mass of the total amount of the monomers serving as the raw materials of the acrylic resin (A).

Examples of the basic compound (B) include organic amines, such as methylamine, dimethylamine, trimethylamine, ethylamine, diethylamine, triethylamine, butylamine, dibutylamine, tributylamine, monoalkanolamines, such as N,N-dimethylethanolamine and 2-aminoethanol, diethanolamine, diisopropanolamine, and dibutanolamine; inorganic basic compounds, such as ammonia, sodium hydroxide, and potassium hydroxide; and quaternary ammonium hydroxides, such as tetramethylammonium hydroxide, tetra-n-butylammonium hydroxide, and trimethylbenzylammonium hydroxide. Among these, organic amines and ammonia (or aqueous ammonia) are preferably used. These basic compounds (B) may be used alone or in combination.

To further improve the storage stability of the water-based resin composition, the amount of the basic compound (B) to be used is preferably such that the neutralization rate of the carboxy group in the polymer (A) ranges from 50% to 100%.

The aqueous medium (C) may be water, an organic solvent that is miscible with water, or a mixture thereof. Examples of the organic solvent that is miscible with water include the alcohol solvents, glycol ether solvents, glycol ester solvents, and ketone solvents exemplified as solvents usable in the production of the polymer (A). In the present invention, water may be used alone, or a mixture of water and an organic solvent that is miscible with water may be used, or an organic solvent that is miscible with water may be used alone. Water alone or a mixture of water and an organic solvent that is miscible with water is preferred in terms of safety and environmental load.

In a water-based resin composition of the present invention, which contains the polymer (A), the basic compound (B), and the aqueous medium (C), the polymer (A) produced by the above method is preferably dissolved or dispersed in the aqueous medium (C).

The polymer (A) is preferably dissolved or dispersed in the aqueous medium (C) by mixing the aqueous medium (C) with the polymer (A) having an acid group neutralized with the basic compound (B).

A water-based paint of the present invention, which contains a water-based resin composition of the present invention, may be a one-component paint without a curing agent or a multiple-component paint with a curing agent.

Examples of the curing agent include polyisocyanate compounds, melamine compounds, epoxy compounds, oxazoline compounds, and carbodiimide compounds.

If necessary, a water-based paint of the present invention may contain various additive agents, such as an inorganic pigment, an organic pigment, an extender pigment, a wax, a surfactant, a stabilizer, a flow modifier, a dye, a leveling agent, a rheology control agent, an ultraviolet absorber, an antioxidant, a plasticizer, an antistatic agent, an antifoaming agent, a viscosity modifier, a light stabilizer, a weathering stabilizer, a heat stabilizer, a pigment dispersant, a thermosetting resin, and a thermoplastic resin.

A paint composition of the present invention may be applied by different coating methods depending on the article to be coating and may be applied with a gravure coater, with a roll coater, with a comma coater, with a knife coater, with an air-knife coater, with a curtain coater, with a kiss coater, with a shower coater, with a wheel coater, with a spin coater, by dipping, by screen printing, by spraying, with an applicator, or with a bar coater.

A water-based paint of the present invention can form a cured coating film with high adhesiveness and blocking resistance on the surface of various articles.

A water-based paint of the present invention may be directly applied to an article to be coated or may be applied after primer coating suitable for an article to be coated.

The material of the article to be coated may be a metal, such as iron, copper, zinc, aluminum, magnesium, or an alloy thereof; a plastic substrate, such as polycarbonate (PC), an acrylonitrile-butadiene-styrene copolymer (ABS), a PC-ABS polymer alloy, poly(methyl methacrylate) (PMMA), polyethylene terephthalate) (PET), polyamide (PA), polypropylene (PP), or a fiber-reinforced plastic (FRP) containing filler, such as glass fiber or carbon fiber; or glass.

Examples of articles with a coating film of a water-based paint of the present invention include housings and internal components of household electrical appliances, such as television sets, refrigerators, washing machines, and air conditioners; housings and internal components of electronic devices, such as smartphones, mobile phones, tablet devices, personal computers, digital cameras, and game machines; housings of office automation equipment, such as printers and facsimile machines; recreational and sporting goods; interior and exterior materials of various vehicles, such as automobiles and railroad cars; industrial machinery; interior and exterior materials of buildings, such as external walls, roofs, glass, and decorative sheets; and civil engineering materials, such as sound barriers and drainages.

EXAMPLES

The present invention is more specifically described in the following examples and comparative examples. The weight-average molecular weight of the polymer (A) was measured under the following GPC measurement conditions.

[GPC Measurement Conditions]

Measuring apparatus: high performance GPC system ("HLC-8220GPC" manufactured by Tosoh Corporation)

Column: The following columns manufactured by Tosoh Corporation were used in series.

"TSKgel G5000" (7.8 mm ID×30 cm)×1
"TSKgel G4000" (7.8 mm ID×30 cm)×1
"TSKgel G3000" (7.8 mm ID×30 cm)×1
"TSKgel G2000" (7.8 mm ID×30 cm)×1

Detector: differential refractometer (RI)

Column temperature: 40° C.

Eluent: tetrahydrofuran (THF)

Flow rate: 1.0 mL/min

Injection volume: 100 μL (a tetrahydrofuran solution with a sample concentration of 4 mg/mL)

Standard samples: A calibration curve was made using the following monodisperse polystyrenes.

(Monodisperse Polystyrenes)

"TSKgel standard polystyrene A-500" manufactured by Tosoh Corporation
"TSKgel standard polystyrene A-1000" manufactured by Tosoh Corporation
"TSKgel standard polystyrene A-2500" manufactured by Tosoh Corporation
"TSKgel standard polystyrene A-5000" manufactured by Tosoh Corporation
"TSKgel standard polystyrene F-1" manufactured by Tosoh Corporation
"TSKgel standard polystyrene F-2" manufactured by Tosoh Corporation
"TSKgel standard polystyrene F-4" manufactured by Tosoh Corporation
"TSKgel standard polystyrene F-10" manufactured by Tosoh Corporation
"TSKgel standard polystyrene F-20" manufactured by Tosoh Corporation
"TSKgel standard polystyrene F-40" manufactured by Tosoh Corporation
"TSKgel standard polystyrene F-80" manufactured by Tosoh Corporation
"TSKgel standard polystyrene F-128" manufactured by Tosoh Corporation
"TSKgel standard polystyrene F-288" manufactured by Tosoh Corporation
"TSKgel standard polystyrene F-550" manufactured by Tosoh Corporation

Example 1: Synthesis and Evaluation of Water-Based Resin Composition (1)

47 parts by mass of dipropylene glycol dimethyl ether (hereinafter abbreviated to "DMM") and 5 parts by mass of hydrogenated polybutadiene with a hydroxy group at both ends (iodine value: 9.5, hydroxyl value: 51, molecular weight: 2,200; hereinafter abbreviated to "hydrogenated polybutadiene (a1-1)) in a 2-L four-neck flask were heated to 95° C. in an inert gas atmosphere.

In the next polymerization process, a liquid mixture of 42 parts by mass of isobornyl acrylate (hereinafter abbreviated to "IBXA"), 43.3 parts by mass of lauryl methacrylate (hereinafter abbreviated to "SLMA"), 2 parts by mass of 2-hydroxypropyl methacrylate (hereinafter abbreviated to "HPMA"), 7.7 parts by mass of acrylic acid (hereinafter abbreviated to "AA"), and 2 parts by mass of t-butyl peroxy-2-ethylhexanoate (hereinafter abbreviated to "P-O") was added dropwise for 4 hours and was stirred for another 3 hours.

In the next water dispersion process, the reaction liquid was cooled to 75° C., and 4.8 parts by mass of N,N-dimethylethanolamine (hereinafter abbreviated to "DMEA") and 159 parts by mass of water were successively added to the reaction liquid to prepare a water-based resin composition (1) as an aqueous dispersion with a solid content of 40%. The polymer had an acid value of 58.8 mgKOH/g and a hydroxyl value of 7.6 mgKOH/g.

Example 2: Synthesis and Evaluation of Water-Based Resin Composition (2)

47 parts by mass of propylene glycol n-propyl ether (hereinafter abbreviated to "PnP") and 5 parts by mass of hydrogenated polybutadiene with a hydroxy group at both ends (iodine value: 7.5, hydroxyl value: 70, molecular weight: 1,600; hereinafter abbreviated to "hydrogenated polybutadiene (a1-2)) in a 2-L four-neck flask were heated to 85° C. in an inert gas atmosphere.

In the next polymerization process, a liquid mixture of 40 parts by mass of methyl methacrylate (hereinafter abbreviated to "MMA"), 41.2 parts by mass of ethyl acrylate (hereinafter abbreviated to "EA"), 5 parts by mass of HPMA, 8.8 parts by mass of AA, and 3 parts by mass of tert-butyl peroxy-2-ethylhexylmonocarbonate (hereinafter abbreviated to "P-E") was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (2) as an aqueous dispersion with a solid content of 40%. The polymer had an acid value of 66.5 mgKOH/g and a hydroxyl value of 18.9 mgKOH/g.

Example 3: Synthesis and Evaluation of Water-Based Resin Composition (3)

47 parts by mass of butyl cellosolve (hereinafter abbreviated to "BCS") and 5 parts by mass of hydrogenated polybutadiene with a hydroxy group at both ends (iodine value: 16.3, hydroxyl value: 51, molecular weight: 2,200; hereinafter abbreviated to "hydrogenated polybutadiene (a1-3)) in a 2-L four-neck flask were heated to 85° C. in an inert gas atmosphere.

In the next polymerization process, a liquid mixture of 54 parts by mass of cyclohexyl methacrylate (hereinafter abbreviated to "CHMA"), 25.1 parts by mass of 2-ethylhexyl acrylate (hereinafter abbreviated to "2EHA"), 11 parts by mass of 2-hydroxyethyl methacrylate (hereinafter abbreviated to "HEMA"), 3.9 parts by mass of AA, 1 part by mass of 2-methacryloyloxyethyl acid phosphate ("Light Ester P-1M" manufactured by Kyoeisha Chemical Co., Ltd., hereinafter abbreviated to "P-1M"), and 1 part by mass of 2,2'-azobis(2-methylbutyronitrile) (hereinafter abbreviated to "ABN-E") was added dropwise for 4 hours and was stirred for another 3 hours.

In the next water dispersion process, the reaction liquid was cooled to 75° C., and 4.8 parts by mass of triethylamine (hereinafter abbreviated to "TEA") and 159 parts by mass of water were successively added to the reaction liquid to prepare a water-based resin composition (3) as an aqueous dispersion with a solid content of 40%. The polymer had an acid value of 32.5 mgKOH/g and a hydroxyl value of 46.9 mgKOH/g.

Example 4: Synthesis and Evaluation of Water-Based Resin Composition (4)

47 parts by mass of DMM and 10 parts by mass of the hydrogenated polybutadiene (a1-1) in a 2-L four-neck flask were heated to 95° C. in an inert gas atmosphere.

In the next polymerization process, a liquid mixture of 40 parts by mass of MMA, 41.1 parts by mass of EA, 5 parts by mass of HPMA, 3.9 parts by mass of AA, and 2 parts by mass of P-O was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (4) as an aqueous dispersion with a solid content of 40%. The polymer had an acid value of 29.8 mgKOH/g and a hydroxyl value of 19.1 mgKOH/g.

Example 5: Synthesis and Evaluation of Water-Based Resin Composition (5)

47 parts by mass of diethylene glycol dimethyl ether (hereinafter abbreviated to "MDM") and 10 parts by mass of the hydrogenated polybutadiene (a1-2) in a 2-L four-neck flask were heated to 85° C. in an inert gas atmosphere.

In the next polymerization process, a liquid mixture of 30 parts by mass of t-butyl methacrylate (hereinafter abbreviated to "tBMA"), 21.7 parts by mass of SLMA, 21.7 parts by mass of EA, 8 parts by mass of HEMA, 3.6 parts by mass of AA, 5 parts by mass of P-1M, and 3 parts by mass of ABN-E was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (5) as an aqueous dispersion with a solid content of 40%. The polymer had an acid value of 39.1 mgKOH/g and a hydroxyl value of 33.5 mgKOH/g.

Example 6: Synthesis and Evaluation of Water-Based Resin Composition (6)

47 parts by mass of BCS and 10 parts by mass of the hydrogenated polybutadiene (a1-3) in a 2-L four-neck flask were heated to 120° C. in an inert gas atmosphere.

In the next polymerization process, a liquid mixture of 34 parts by mass of IBXA, 33 parts by mass of SLMA, 16.4 parts by mass of methoxypoly(ethylene glycol) acrylate (AM-130G manufactured by Shin Nakamura Chemical Co., Ltd., hereinafter abbreviated to "AM-130G"), 4 parts by mass of HPMA, 2.6 parts by mass of AA, and 2 parts by mass of P-E was added dropwise for 4 hours and was stirred for another 3 hours.

In the next water dispersion process, the reaction liquid was cooled to 75° C., and 4.8 parts by mass of TEA and 159 parts by mass of water were successively added to the reaction liquid to prepare a water-based resin composition (6) as an aqueous dispersion with a solid content of 40%. The polymer had an acid value of 19.8 mgKOH/g and a hydroxyl value of 15.3 mgKOH/g.

Example 7: Synthesis and Evaluation of Water-Based Resin Composition (7)

47 parts by mass of DMM and 25 parts by mass of the hydrogenated polybutadiene (a1-1) in a 2-L four-neck flask were heated to 95° C. in an inert gas atmosphere.

In the next polymerization process, a liquid mixture of 20 parts by mass of IBXA, 15 parts by mass of CHMA, 3 parts by mass of 2EHA, 25 parts by mass of AM-130G, 4 parts by mass of HEMA, 4 parts by mass of HPMA, 3 parts by mass of AA, 1 part by mass of vinyl sulfonic acid, and 1 part by mass of P-O was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (7) as an aqueous dispersion with a solid content of 40%. The polymer had an acid value of 28.3 mgKOH/g and a hydroxyl value of 32.5 mgKOH/g.

Example 8: Synthesis and Evaluation of Water-Based Resin Composition (8)

47 parts by mass of PnP and 25 parts by mass of the hydrogenated polybutadiene (a1-2) in a 2-L four-neck flask were heated to 108° C. in an inert gas atmosphere.

In the next polymerization process, a liquid mixture of 18 parts by mass of MMA, 16 parts by mass of tBMA, 12 parts by mass of SLMA, 12 parts by mass of EA, 12 parts by mass of HPMA, 5 parts by mass of AA, 1 part by mass of P-O, and 1 part by mass of P-E was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (8) as an aqueous dispersion with a solid content of 40%. The polymer had an acid value of 38.2 mgKOH/g and a hydroxyl value of 45.8 mgKOH/g.

Example 9: Synthesis and Evaluation of Water-Based Resin Composition (9)

47 parts by mass of MDM and 25 parts by mass of the hydrogenated polybutadiene (a1-3) in a 2-L four-neck flask were heated to 85° C. in an inert gas atmosphere.

In the next polymerization process, a liquid mixture of 35 parts by mass of MMA, 25 parts by mass of 2EHA, 7 parts by mass of HEMA, 4 parts by mass of AA, 4 parts by mass of vinyl sulfonic acid, and 2 parts by mass ABN-E was added dropwise for 4 hours and was stirred for another 3 hours.

In the next water dispersion process, the reaction liquid was cooled to 75° C., and 4.8 parts by mass of TEA and 159 parts by mass of water were successively added to the reaction liquid to prepare a water-based resin composition (9) as an aqueous dispersion with a solid content of 40%. The polymer had an acid value of 50.9 mgKOH/g and a hydroxyl value of 29.6 mgKOH/g.

Example 10: Synthesis and Evaluation of Water-Based Resin Composition (10)

47 parts by mass of PnP and 35 parts by mass of the hydrogenated polybutadiene (a1-1) in a 2-L four-neck flask were heated to 120° C. in an inert gas atmosphere.

In the next polymerization process, a liquid mixture of 32 parts by mass of tBMA, 27.1 parts by mass of EA, 2 parts by mass of HEMA, 3.9 parts by mass of AA, 4 parts by mass of vinyl sulfonic acid, and 2 parts by mass P-E was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (10) as an aqueous dispersion with a solid content of 40%. The polymer had an acid value of 29.8 mgKOH/g and a hydroxyl value of 8.5 mgKOH/g.

Example 11: Synthesis and Evaluation of Water-Based Resin Composition (11)

47 parts by mass of MDM and 35 parts by mass of the hydrogenated polybutadiene (a1-2) in a 2-L four-neck flask were heated to 95° C. in an inert gas atmosphere.

In the next polymerization process, a liquid mixture of 20 parts by mass of IBXA, 18 parts by mass of CHMA, 5 parts by mass of 2EHA, 10 parts by mass of AM-130G, 5 parts by mass of HPMA, 6.5 parts by mass of AA, 0.5 parts by mass of vinyl sulfonic acid, and 3 parts by mass of P-O was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (11) as an aqueous dispersion with a solid content of 40%. The polymer had an acid value of 51.7 mgKOH/g and a hydroxyl value of 18.9 mgKOH/g.

Example 12: Synthesis and Evaluation of Water-Based Resin Composition (12)

47 parts by mass of BCS and 35 parts by mass of the hydrogenated polybutadiene (a1-3) in a 2-L four-neck flask were heated to 85° C. in an inert gas atmosphere.

In the next polymerization process, a liquid mixture of 41.9 parts by mass of MMA, 11.1 parts by mass of AM-130G, 6 parts by mass of HPMA, 5 parts by mass of AA, 1 part by mass of vinyl sulfonic acid, and 1 part by mass of ABN-E was added dropwise for 4 hours and was stirred for another 3 hours.

In the next water dispersion process, the reaction liquid was cooled to 75° C., and 4.8 parts by mass of TEA and 159 parts by mass of water were successively added to the reaction liquid to prepare a water-based resin composition (12) as an aqueous dispersion with a solid content of 40%. The polymer had an acid value of 43.7 mgKOH/g and a hydroxyl value of 23.1 mgKOH/g.

Example 13: Synthesis and Evaluation of Water-Based Resin Composition (13)

47 parts by mass of DMM and 10 parts by mass of hydrogenated polybutadiene (iodine value: 5.3, hydroxyl value: 0, molecular weight: 2,100; hereinafter abbreviated to "hydrogenated polybutadiene (a1-4)) in a 2-L four-neck flask were heated to 95° C. in an inert gas atmosphere.

In the next polymerization process, a liquid mixture of 40 parts by mass of MMA, 41.1 parts by mass of EA, 5 parts by mass of HPMA, 3.9 parts by mass of AA, and 2 parts by mass of P-O was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (13) as an aqueous dispersion with a solid content of 40%. The polymer had an acid value of 29.8 mgKOH/g and a hydroxyl value of 19.1 mgKOH/g.

Comparative Example 1: Synthesis and Evaluation of Water-Based Resin Composition (R1)

47 parts by mass of DMM and 3 parts by mass of the hydrogenated polybutadiene (a1-1) in a 2-L four-neck flask were heated to 85° C. in an inert gas atmosphere.

In the next polymerization process, a liquid mixture of 25 parts by mass of MMA, 15 parts by mass of tBMA, 13 parts by mass of SLMA, 33 parts by mass of 2EHA, 3 parts by mass of HEMA, 3 parts by mass of HPMA, 5 parts by mass of AA, and 2 parts by mass of ABN-E was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (R1) as an aqueous dispersion with a solid content of 40%. The polymer had an acid value of 38.2 mgKOH/g and a hydroxyl value of 24.1 gKOH/g.

Comparative Example 2: Synthesis and Evaluation of Water-Based Resin Composition (R2)

47 parts by mass of DMM and 40 parts by mass of the hydrogenated polybutadiene (a1-1) in a 2-L four-neck flask were heated to 95° C. in an inert gas atmosphere.

In the next polymerization process, a liquid mixture of 21 parts by mass of MMA, 10 parts by mass of tBMA, 16 parts by mass of SLMA, 6 parts by mass of 2EHA, 2 parts by mass of HPMA, 5 parts by mass of AA, and 1 part by mass of P-O was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (R2) as an aqueous dispersion with a solid content of 40%. The polymer had an acid value of 38.2 mgKOH/g and a hydroxyl value of 16.1 mgKOH/g.

Comparative Example 3: Synthesis and Evaluation of Water-Based Resin Composition (R3)

47 parts by mass of PnP and 17 parts by mass of the hydrogenated polybutadiene (a1-1) in a 2-L four-neck flask were heated to 120° C. in an inert gas atmosphere.

In the next polymerization process, a liquid mixture of 20 parts by mass of IBXA, 15 parts by mass of CHMA, 20 parts by mass of 2EHA, 20 parts by mass of AM-130G, 7 parts by mass of HPMA, 1 part by mass of AA, and 2 parts by mass of P-E was added dropwise for 4 hours and was stirred for another 3 hours.

In the next water dispersion process, the reaction liquid was cooled to 75° C., and 2 parts by mass of DMEA and 159 parts by mass of water were successively added to the reaction liquid to prepare a water-based resin composition (R3) as an aqueous dispersion with a solid content of 40%.

The polymer had an acid value of 7.6 mgKOH/g and a hydroxyl value of 26.7 mgKOH/g.

Comparative Example 4: Synthesis and Evaluation of Water-Based Resin Composition (R4)

47 parts by mass of PnP and 17 parts by mass of the hydrogenated polybutadiene (a1-1) in a 2-L four-neck flask were heated to 85° C. in an inert gas atmosphere.

In the next polymerization process, a liquid mixture of 10 parts by mass of IBXA, 15 parts by mass of CHMA, 20 parts by mass of 2EHA, 21 parts by mass of AM-130G, 7 parts by mass of HPMA, 10 parts by mass of AA, and 1 part by mass of ABN-E was added dropwise for 4 hours and was stirred for another 3 hours.

In the next water dispersion process, the reaction liquid was cooled to 75° C., and 5.7 parts by mass of DMEA and 159 parts by mass of water were successively added to the reaction liquid to prepare a water-based resin composition (R4) as an aqueous dispersion with a solid content of 40%. The polymer had an acid value of 77.1 mgKOH/g and a hydroxyl value of 27.0 mgKOH/g.

Comparative Example 5: Synthesis and Evaluation of Water-Based Resin Composition (R5)

47 parts by mass of DMM and 10 parts by mass of hydrogenated polybutadiene with a hydroxy group at both ends (iodine value: 2.5, hydroxyl value: 51, molecular weight: 2,200; hereinafter abbreviated to "hydrogenated polybutadiene (Ra1-1)) in a 2-L four-neck flask were heated to 95° C. in an inert gas atmosphere.

In the next polymerization process, a liquid mixture of 40 parts by mass of MMA, 41.1 parts by mass of EA, 5 parts by mass of HPMA, 3.9 parts by mass of AA, and 2 parts by mass of P-O was added dropwise for 4 hours and was stirred for another 3 hours.

In the next water dispersion process, the reaction liquid was cooled to 75° C., and 4.8 parts by mass of DMEA and 159 parts by mass of water were successively added to the reaction liquid to prepare a water-based resin composition (R5) as an aqueous dispersion with a solid content of 40%.

The polymer had an acid value of 29.8 mgKOH/g and a hydroxyl value of 19.1 mgKOH/g.

Comparative Example 6: Synthesis and Evaluation of Water-Based Resin Composition (R6)

47 parts by mass of DMM and 10 parts by mass of hydrogenated polybutadiene with a hydroxy group at both ends (iodine value: 43.1, hydroxyl value: 51, molecular weight: 2,200; hereinafter abbreviated to "hydrogenated polybutadiene (Ra1-2)) in a 2-L four-neck flask were heated to 95° C. in an inert gas atmosphere.

In the next polymerization process, a liquid mixture of 40 parts by mass of MMA, 41.1 parts by mass of EA, 5 parts by mass of HPMA, 3.9 parts by mass of AA, and 2 parts by mass of P-O was added dropwise for 4 hours. The liquid mixture gelled during the reaction, and no polymer was produced.

[Evaluation of Storage Stability]

The water-based resin compositions were left standing at 40° C. for 1 month and were visually inspected for their appearance. The storage stability was rated according to the following criteria. ⊙ and ○ indicate that the performance is acceptable for practical applications. Gelation is described as "Gel".

⊙: No significant difference in appearance.

○: Slight solvent separation is observed on the surface of the solution, but mild mixing makes the solution uniform.

x: Resin is separated by sedimentation, and even vigorous mixing results in separation of resin again.

Tables 1 to 5 list the polymer compositions and evaluation results of Examples 1 to 13 and Comparative Examples 1 to 6.

TABLE 1

| | Water-based resin composition | | Example 1 (1) | Example 2 (2) | Example 3 (3) | Example 4 (4) | Example 5 (5) |
|---|---|---|---|---|---|---|---|
| Composition of polymer (A) (parts by mass) | Hydrogenated polybutadiene (a1) | Hydrogenated polybutadiene (a1-1) (iodine value: 9.5, hydroxyl value: 51, number-average molecular weight: 2,200) | 5 | | | 10 | |
| | | Hydrogenated polybutadiene (a1-2) (iodine value: 7.5, hydroxyl value: 70, number-average molecular weight: 1,600) | | 5 | | | 10 |
| | | Hydrogenated polybutadiene (a1-3) (iodine value: 16.3, hydroxyl value: 29, number-average molecular weight: 3,900) | | | 5 | | |
| | Monomer (a2) with acid group | AA | 7.7 | 8.8 | 3.9 | 3.9 | 3.6 |
| | | P-1M | | | 1 | | 5 |
| | Monomer (a3) with hydroxy group | HEMA | | | 11 | | 8 |
| | | HPMA | 2 | 5 | | 5 | |
| | Another monomer (a4) | IBXA | 42 | | | | |
| | | MMA | | 40 | | 40 | |
| | | tBMA | | | | | 30 |
| | | CHMA | | | 54 | | |
| | | SLMA | 43.3 | | | | 21.7 |
| | | 2EHA | | | 25.1 | | |

TABLE 1-continued

| Water-based resin composition | Example 1 (1) | Example 2 (2) | Example 3 (3) | Example 4 (4) | Example 5 (5) |
|---|---|---|---|---|---|
| EA | | 41.2 | | 41.1 | 21.7 |
| Acid value (mgKOH/g) | 58.8 | 66.5 | 32.5 | 29.8 | 39.1 |
| Storage stability | ◉ | ◉ | ◉ | ◉ | ◉ |

TABLE 2

| | | Water-based resin composition | Example 6 (6) | Example 7 (7) | Example 8 (8) | Example 9 (9) |
|---|---|---|---|---|---|---|
| Composition of polymer (A) (parts by mass) | Hydrogenated polybutadiene (a1) | Hydrogenated polybutadiene (a1-1) (iodine value: 9.5, hydroxyl value: 70, number-average molecular weight: 2,200) | | 25 | | |
| | | Hydrogenated polybutadiene (a1-2) (iodine value: 7.5, hydroxyl value: 70, number-average molecular weight: 1,600) | | | 25 | |
| | | Hydrogenated polybutadiene (a1-3) (iodine value: 16.3, hydroxyl value: 29, number-average molecular weight: 3,900) | 10 | | | 25 |
| | Monomer (a2) with acid group | AA | 2.6 | 3 | 5 | 4 |
| | | Vinyl sulfonic acid | | 1 | | 4 |
| | Monomer (a3) with hydroxy group | HEMA | | 4 | | 7 |
| | | HPMA | 4 | 4 | 12 | |
| | Another monomer (a4) | IBXA | 34 | 20 | | |
| | | MMA | | | 18 | 35 |
| | | tBMA | | | 16 | |
| | | CHMA | | 15 | | |
| | | SLMA | 33 | | 12 | |
| | | 2EHA | | 3 | | 25 |
| | | EA | | | 12 | |
| | | AM-130G | 16.4 | 25 | | |
| | Acid value (mgKOH/g) | | 19.8 | 45.8 | 38.2 | 50.9 |
| | Storage stability | | ○ | ◉ | ◉ | ◉ |

TABLE 3

| | | Water-based resin composition | Example 10 (10) | Example 11 (11) | Example 12 (12) | Example 13 (13) |
|---|---|---|---|---|---|---|
| Composition of polymer (A) (parts by mass) | Hydrogenated polybutadiene (a1) | Hydrogenated polybutadiene (a1-1) (iodine value: 9.5, hydroxyl value: 70, number-average molecular weight: 2,200) | 35 | | | |
| | | Hydrogenated polybutadiene (a1-2) (iodine value: 7.5, hydroxyl value: 70, number-average molecular weight: 1,600) | | 35 | | |
| | | Hydrogenated polybutadiene (a1-3) (iodine value: 16.3, hydroxyl value: 29, number-average molecular weight: 3,900) | | | 35 | |
| | | Hydrogenated polybutadiene (a1-4) (iodine value: 5.3, hydroxyl value: 0, number-average molecular weight: 2,100) | | | | 10 |

TABLE 3-continued

| Water-based resin composition | | Example 10 (10) | Example 11 (11) | Example 12 (12) | Example 13 (13) |
|---|---|---|---|---|---|
| Monomer (a2) with acid group | AA | 3.9 | 6.5 | 5 | 3.9 |
| | Vinyl sulfonic acid | | 0.5 | 1 | |
| Monomer (a3) with hydroxy group | HEMA | 2 | | | |
| | HPMA | | 5 | 6 | 5 |
| Another monomer (a4) | IBXA | | 20 | | |
| | MMA | | | 41.9 | 40 |
| | tBMA | 32 | | | |
| | CHMA | | 18 | | |
| | 2EHA | | 5 | | |
| | EA | 27.1 | | | 41.1 |
| | AM-130G | | 10 | 11.1 | |
| Acid value (mgKOH/g) | | 29.8 | 51.7 | 43.7 | 29.8 |
| Storage stability | | ⊙ | ⊙ | ⊙ | ⊙ |

TABLE 4

| Water-based resin composition | | | Comparative example 1 (R1) | Comparative example 2 (R2) | Comparative example 3 (R3) |
|---|---|---|---|---|---|
| Composition of polymer (A) (parts by mass) | Hydrogenated polybutadiene (a1) | Hydrogenated polybutadiene (a1-1) (iodine value: 9.5, hydroxyl value: 70, number-average molecular weight: 2,200) | 3 | 40 | 17 |
| | Monomer (a2) with acid group | AA | 5 | 5 | 1 |
| | Monomer (a3) with hydroxy group | HEMA | 3 | | |
| | | HPMA | 3 | 2 | 7 |
| | Another monomer (a4) | IBXA | | | 20 |
| | | MMA | 25 | 21 | |
| | | tBMA | 15 | 10 | |
| | | CHMA | | | 15 |
| | | SLMA | 13 | 16 | |
| | | 2EHA | 33 | 6 | 20 |
| | | AM-130G | | | 20 |
| Acid value (mgKOH/g) | | | 38.2 | 38.2 | 7.6 |
| Storage stability | | | ⊙ | ⊙ | X |

TABLE 5

| Water-based resin composition | | | Comparative example 4 (R4) | Comparative example 5 (R5) | Comparative example 6 (R6) |
|---|---|---|---|---|---|
| Composition of polymer (A) (parts by mass) | Hydrogenated polybutadiene (a1) | Hydrogenated polybutadiene (a1-1) (iodine value: 9.5, hydroxyl value: 70, number-average molecular weight: 2,200) | 17 | 10 | 10 |
| | Monomer (a2) with acid group | AA | 10 | 3.9 | 3.9 |
| | Monomer (a3) with hydroxy group | HPMA | 7 | 5 | 5 |
| | Another monomer (a4) | IBXA | 10 | | |
| | | MMA | | 40 | 40 |
| | | CHMA | 15 | | |
| | | 2EHA | 20 | | |
| | | EA | | 41.1 | 41.1 |
| | | AM-130G | 21 | | |
| Acid value (mgKOH/g) | | | 77.1 | 29.8 | — |
| Storage stability | | | ⊙ | X | Gel |

Example 14: Preparation and Evaluation of Water-Based Paint (1)

0.2 parts by mass of a leveling agent ("BYK-348" manufactured by BYK Chemie) and 0.1 parts by mass of an antifoaming agent ("SN Defoamer 777" manufactured by San Nopco Ltd.) were added to 100 parts by mass of the water-based resin composition (1) prepared in Example 1 and were stirred for 15 minutes. The water-based resin composition (1) was then diluted with ion-exchanged water to a paint viscosity of 12 seconds measured with a viscosity cup NK-2 (manufactured by ANEST IWATA Corporation). Thus, a water-based paint (1) was prepared.

[Preparation of Coating Film for Evaluation]

The water-based paint (1) was applied to an acrylonitrile-butadiene-styrene copolymer (ABS) sheet, a poly(methyl methacrylate) (PMMA) sheet, a glass sheet, an Al1050 sheet, and a SUS304 sheet with a spray gun to a dry film thickness of 20 μm. The water-based paint (1) was then dried at 80° C. for 10 minutes in a dryer to form a coating film for evaluation.

[Evaluation of Adhesion to Substrate]

The adhesiveness of the coating film for evaluation to a substrate was evaluated by a cross-cut test method according to JIS K-5400. A surface of the coating film was cut with a cutter at intervals of 1 mm to form a grid pattern including 100 squares. A cellophane adhesive tape was put on the 100 squares and was quickly peeled off. The number of squares remaining on the substrate after the test was expressed in percentage. Thus, 100% means that no square is peeled off, and 0% means that all the squares are peeled off. 95% or more indicates that the performance is acceptable for practical applications.

[Evaluation of Blocking Resistance]

Among the above coating films for evaluation, two ABS sheets were brought into contact with each other with their painted surfaces facing each other. The ABS sheets were then pressed at 1 kg/cm² and were left standing at a temperature of 25° C. for 1 minute. After the pressure was released, the two test sheets were separated. The feeling of resistance during separation and the peeling of coating films were rated according to the following criteria. ⊙ and ○ indicate that the performance is acceptable for practical applications.

⊙: There is no resistance during separation, and no defect is observed on the coating films.

○: There is slight resistance during separation, but no defect is observed on the coating films.

x: There is resistance during separation, and the coating films are partly peeled off.

Examples 15 to 26: Preparation and Evaluation of Water-Based Paints (15) to (26)

Water-based paints (2) to (13) were prepared in the same manner as in Example 14 except that the water-based resin composition (1) was substituted with water-based resin compositions (2) to (13), and were subjected to various evaluations.

Comparative Examples 7 to 9: Preparation and Evaluation of Water-Based Paints (R1), (R2), and (R4)

Water-based paints (R1), (R2), and (R4) were prepared in the same manner as in Example 14 except that the water-based resin composition (1) was substituted with water-based resin compositions (R1), (R2), and (R4), and were subjected to various evaluations.

Tables 6 to 8 list the compositions and evaluation results of Examples 14 to 26 and Comparative Examples 7 to 12.

TABLE 6

| Water-based paint | | Example 14 (1) | Example 15 (2) | Example 16 (3) | Example 17 (4) | Example 18 (5) | Example 19 (6) | Example 20 (7) |
|---|---|---|---|---|---|---|---|---|
| Adhesion to substrate | ABS | 100% | 100% | 100% | 100% | 100% | 100% | 100% |
| | PMMA | 100% | 100% | 100% | 100% | 100% | 100% | 100% |
| | Glass | 100% | 100% | 100% | 100% | 100% | 100% | 100% |
| | Al 1050 | 100% | 100% | 100% | 100% | 100% | 100% | 100% |
| | SUS 304 | 100% | 100% | 100% | 100% | 100% | 100% | 100% |
| Blocking resistance | | ⊙ | ⊙ | ⊙ | ⊙ | ○ | ○ | ⊙ |

TABLE 7

| Water-based paint | | Example 21 (8) | Example 22 (9) | Example 23 (10) | Example 24 (11) | Example 25 (12) | Example 26 (13) |
|---|---|---|---|---|---|---|---|
| Adhesion to substrate | ABS | 100% | 100% | 100% | 100% | 100% | 100% |
| | PMMA | 100% | 100% | 100% | 100% | 100% | 100% |
| | Glass | 100% | 100% | 100% | 100% | 100% | 100% |
| | Al 1050 | 100% | 100% | 100% | 100% | 100% | 100% |
| | SUS 304 | 100% | 100% | 100% | 100% | 100% | 100% |
| Blocking resistance | | ⊙ | ⊙ | ○ | ○ | ○ | ⊙ |

TABLE 8

| Water-based paint | | Comparative example 7 (R1) | Comparative example 8 (R2) | Comparative example 9 (R4) |
|---|---|---|---|---|
| Adhesion to substrate | ABS | 100% | 100% | 100% |
| | PMMA | 0% | 100% | 100% |
| | Glass | 0% | 100% | 100% |
| | Al 1050 | 60% | 100% | 100% |
| | SUS 304 | 30% | 100% | 100% |
| Blocking resistance | | ⊙ | X | X |

The water-based resin compositions of Examples 1 to 13 of the present invention had high storage stability, and the coating films of the water-based resin compositions had high adhesiveness to various substrates and high blocking resistance (Examples 14 to 26).

The coating film of Comparative Example 1, in which the hydrogenated polybutadiene (a1) constituted less than 4% by mass, which is the lower limit of the present invention, had insufficient adhesion to the substrates (Comparative Example 7).

The coating film of Comparative Example 2, in which the hydrogenated polybutadiene (a1) constituted more than 38% by mass, which is the upper limit of the present invention, had low blocking resistance (Comparative Example 8).

Comparative Example 3, in which the polymer (A) had an acid value below 10 mgKOH/g, which is the lower limit of the present invention, had low storage stability.

The coating film of Comparative Example 4, in which the polymer (A) had an acid value above 75 mgKOH/g, which is the upper limit of the present invention, had low blocking resistance (Comparative Example 9).

Comparative Example 5, in which the hydrogenated polybutadiene had an iodine value below 5, which is the lower limit of the present invention, had low storage stability.

Comparative Example 6, in which the hydrogenated polybutadiene had an iodine value above 25, which is the upper limit of the present invention, had low storage stability.

Examples 27 to 29 and Comparative Example 10: Preparation and Evaluation of Water-Based Two-Component Paints (1) to (3) and (R1)

As shown in Table 9, the water-based resin composition, the leveling agent ("BYK-348" manufactured by BYK Chemie), the antifoaming agent ("SN Defoamer 777" manufactured by San Nopco Ltd.), and a polyisocyanate curing agent ("Burnock DNW-5500" manufactured by DIC Corporation, solid content: 80% by mass, isocyanate content: 13.5% by mass) were mixed to prepare water-based two-component paints (1) to (3) and (R1). The equivalent ratio (NCO/OH) of the isocyanate group (NCO) of the polyisocyanate curing agent to the hydroxy group (OH) of the water-based resin composition was 1.2.
[Preparation of Coating Film for Evaluation]

The water-based two-component paints (1) to (3) and (R1) were applied to an acrylonitrile-butadiene-styrene copolymer (ABS) sheet, a poly(methyl methacrylate) (PMMA) sheet, a glass sheet, an A11050 sheet, and a SUS304 sheet with a spray gun to a dry film thickness of 20 μm. The paints were then dried at 80° C. for 10 minutes in a dryer and were left standing at 25° C. for 1 week to form coating films for evaluation.

Examples 30 to 32 and Comparative Example 11: Preparation and Evaluation of Water-Based Two-Component Paints (4) to (6) and (R2)

As shown in Table 10, the water-based resin composition, the leveling agent, the antifoaming agent, and a melamine curing agent ("Watersol S-695" manufactured by DIC Corporation, solid content: 66% by mass) were mixed to prepare water-based two-component paints (4) to (6) and (R2). The solid content ratio of the melamine curing agent to the water-based resin composition was 20/80.
[Preparation of Coating Film for Evaluation]

The water-based two-component paints (4) to (6) and (R2) were applied to a glass sheet, an A11050 sheet, and a SUS304 sheet with a spray gun to a dry film thickness of 20 μm. The paints were then dried at 140° C. for 20 minutes in a dryer to form coating films for evaluation.

Examples 33 to 35 and Comparative Example 12: Preparation and Evaluation of Water-Based Two-Component Paints (7) to (9) and (R3)

As shown in Table 11, the water-based resin composition, the leveling agent, the antifoaming agent, and a carbodiimide curing agent ("Carbodilite V-02-L2" manufactured by Nisshinbo Chemical Inc., solid content: 40% by mass, carbodiimide equivalent: 385) were mixed to prepare water-based two-component paints (7) to (9) and (R3). The equivalent ratio (the carbodiimide group of the carbodiimide curing agent/the carboxy group of the water-based resin composition) was 1.0.
[Preparation of Coating Film for Evaluation]

The water-based two-component paints (7) to (9) and (R3) were applied to an acrylonitrile-butadiene-styrene copolymer (ABS) sheet, a poly(methyl methacrylate) (PMMA) sheet, a glass sheet, an A11050 sheet, and a SUS304 sheet with a spray gun to a dry film thickness of 20 μm. The paints were then dried at 80° C. for 10 minutes in a dryer and were left standing at 25° C. for 24 hours to form coating films for evaluation.

Examples 36 to 38 and Comparative Example 13: Preparation and Evaluation of Water-Based Two-Component Paints (10) to (12) and (R4)

As shown in Table 12, the water-based resin composition, the leveling agent, the antifoaming agent, and an epoxy curing agent ("Denacol EX-614B" manufactured by Nagase ChemteX Corporation, solid content: 100% by mass, epoxy equivalent: 173) were mixed to prepare water-based two-component paints (10) to (12) and (R4). The equivalent ratio (the epoxy group of the epoxy curing agent/the carboxy group of the water-based resin composition) was 1.0.
[Preparation of Coating Film for Evaluation]

The water-based two-component paints (10) to (12) and (R4) were applied to a glass sheet, an A11050 sheet, and a SUS304 sheet with a spray gun to a dry film thickness of 20 μm. The paints were then dried at 120° C. for 60 minutes in a dryer to form coating films for evaluation.
[Evaluation of Adhesion to Substrate]

The coating films for evaluation of the water-based two-component paints were subjected to the cross-cut test method according to JIS K-5400 to evaluate adhesion to a substrate. A surface of each coating film was cut with a cutter at intervals of 1 mm to form a grid pattern including 100 squares. A cellophane adhesive tape was put on the 100 squares and was quickly peeled off. The number of squares remaining on the substrate after the test was expressed in percentage. Thus, 100% means that no square is peeled off, and 0% means that all the squares are peeled off. 95% or more indicates that the performance is acceptable for practical applications.
[Evaluation of Water Resistance]

The coating films for evaluation of the water-based two-component paints were immersed in warm water at 40° C. for 24 hours, were then taken out, and were subjected to the evaluation of adhesion to a substrate.

Tables 9 to 12 list the blend compositions and evaluation results of Examples 27 to 38 and Comparative Examples 10 to 13.

TABLE 9

| Water-based two-component paint | | Example 27 (1) | Example 28 (2) | Example 29 (3) | Comparative example 10 (R1) |
|---|---|---|---|---|---|
| Composition (parts by mass) | Water-based resin composition (3) | 100 | | | |
| | Water-based resin composition (4) | | 100 | | |
| | Water-based resin composition (7) | | | 100 | |
| | Water-based resin composition (R1) | | | | 100 |
| | Polyisocyanate curing agent Burnock DNW-5500 | 12.6 | 5.2 | 8.7 | 6.5 |
| | BYK-348 | 0.2 | 0.2 | 0.2 | 0.2 |
| | SN Defoamer 777 | 0.1 | 0.1 | 0.1 | 0.1 |
| Equivalent ratio (isocyanate group of polyisocyanate curing agent/hydroxy group of water-based resin composition) | | 1.2 | 1.2 | 1.2 | 1.2 |
| Adhesion to substrate | ABS | 100% | 100% | 100% | 100% |
| | PMMA | 100% | 100% | 100% | 100% |
| | Glass | 100% | 100% | 100% | 0% |
| | Al 1050 | 100% | 100% | 100% | 70% |
| | SUS 304 | 100% | 100% | 100% | 50% |
| Water resistance | ABS | 100% | 100% | 100% | 100% |
| | PMMA | 100% | 100% | 100% | 100% |
| | Glass | 100% | 100% | 100% | 0% |
| | Al 1050 | 100% | 100% | 100% | 0% |
| | SUS 304 | 100% | 100% | 100% | 0% |

TABLE 10

| Water-based two-component paint | | Example 30 (4) | Example 31 (5) | Example 32 (6) | Comparative example 11 (R2) |
|---|---|---|---|---|---|
| Composition (parts by mass) | Water-based resin composition (3) | 100 | | | |
| | Water-based resin composition (4) | | 100 | | |
| | Water-based resin composition (7) | | | 100 | |
| | Water-based resin composition (R1) | | | | 100 |
| | Melamine curing agent Watersol S-695 | 15.2 | 15.2 | 15.2 | 15.2 |
| | BYK-348 | 0.2 | 0.2 | 0.2 | 0.2 |
| | SN Defoamer 777 | 0.1 | 0.1 | 0.1 | 0.1 |
| Solid content ratio (water-based resin composition/curing agent) | | 80/20 | 80/20 | 80/20 | 80/20 |
| Adhesion to substrate | Glass | 100% | 100% | 100% | 0% |
| | Al 1050 | 100% | 100% | 100% | 60% |
| | SUS 304 | 100% | 100% | 100% | 0% |
| Water resistance | Glass | 100% | 100% | 100% | 0% |
| | Al 1050 | 100% | 100% | 100% | 20% |
| | SUS 304 | 100% | 100% | 100% | 0% |

TABLE 11

| Water-based two-component paint | | Example 33 (7) | Example 34 (8) | Example 35 (9) | Comparative example 12 (R3) |
|---|---|---|---|---|---|
| Composition (parts by mass) | Water-based resin composition (3) | 100 | | | |
| | Water-based resin composition (4) | | 100 | | |
| | Water-based resin composition (7) | | | 100 | |
| | Water-based resin composition (R1) | | | | 100 |
| | Carbodiimide curing agent Carbodilite V-02-L2 | 8.9 | 8.2 | 12.6 | 10.5 |
| | BYK-348 | 0.2 | 0.2 | 0.2 | 0.2 |
| | SN Defoamer 777 | 0.1 | 0.1 | 0.1 | 0.1 |
| Equivalent ratio (carbodiimide group of carbodiimide curing agent/carboxy group of water-based resin composition) | | 1.0 | 1.0 | 1.0 | 1.0 |
| Adhesion to substrate | ABS | 100% | 100% | 100% | 100% |
| | PMMA | 100% | 100% | 100% | 100% |
| | Glass | 100% | 100% | 100% | 0% |
| | Al 1050 | 100% | 100% | 100% | 70% |
| | SUS 304 | 100% | 100% | 100% | 30% |

TABLE 11-continued

| Water-based two-component paint | | Example 33 (7) | Example 34 (8) | Example 35 (9) | Comparative example 12 (R3) |
|---|---|---|---|---|---|
| Water resistance | ABS | 100% | 100% | 100% | 100% |
| | PMMA | 100% | 100% | 100% | 100% |
| | Glass | 100% | 100% | 100% | 0% |
| | Al 1050 | 100% | 100% | 100% | 30% |
| | SUS 304 | 100% | 100% | 100% | 10% |

TABLE 12

| Water-based two-component paint | | Example 36 (10) | Example 37 (11) | Example 38 (12) | Comparative example 13 (R4) |
|---|---|---|---|---|---|
| Composition (parts by mass) | Water-based resin composition (3) | 100 | | | |
| | Water-based resin composition (4) | | 100 | | |
| | Water-based resin composition (7) | | | 100 | |
| | Water-based resin composition (R1) | | | | 100 |
| | Epoxy curing agent Denacol EX-614B | 4.0 | 3.7 | 5.6 | 4.7 |
| | BYK-348 | 0.2 | 0.2 | 0.2 | 0.2 |
| | SN Defoamer 777 | 0.1 | 0.1 | 0.1 | 0.1 |
| Equivalent ratio (epoxy group of epoxy curing agent/carboxy group of water-based resin composition) | | 1.0 | 1.0 | 1.0 | 1.0 |
| Adhesion to substrate | Glass | 100% | 100% | 100% | 0% |
| | Al 1050 | 100% | 100% | 100% | 70% |
| | SUS 304 | 100% | 100% | 100% | 30% |
| Water resistance | Glass | 100% | 100% | 100% | 0% |
| | Al 1050 | 100% | 100% | 100% | 30% |
| | SUS 304 | 100% | 100% | 100% | 10% |

The coating films of the water-based two-component paints of Examples 27 to 38 had high adhesiveness to various substrates and high water resistance.

By contrast, the coating films of Comparative Examples 10 to 13, in which the hydrogenated polybutadiene (a1) in the raw materials of the polymer (A) constituted less than 4% by mass, which is the lower limit of the present invention, had insufficient adhesion to the substrates and insufficient water resistance.

The invention claimed is:

1. A water-based resin composition comprising: a polymer (A), which is a reaction product of a hydrogenated polybutadiene (a1) with an iodine value in the range of 5 to 25, a monomer (a2) with an acid group, and a monomer (a3) with a hydroxy group as essential raw materials; a basic compound (B); and an aqueous medium (C), wherein the hydrogenated polybutadiene (a1) constitutes 4% to 38% by mass of the raw materials of the polymer (A), the polymer (A) has an acid value in the range of 10 to 65 mgKOH/g, and the aqueous medium (C) contains a glycol ether solvent miscible with water.

2. The water-based resin composition according to claim 1, wherein the hydrogenated polybutadiene (a1) has a number-average molecular weight in the range of 1,000 to 5,000.

3. The water-based resin composition according to claim 1, wherein the polymer (A) has a hydroxyl value in the range of 5 to 50 mgKOH/g.

4. A water-based paint comprising the water-based resin composition according to claim 1.

5. An article comprising a coating film of the water-based paint according to claim 4.

* * * * *